United States Patent
Hatakeyama

(10) Patent No.: US 12,122,450 B2
(45) Date of Patent: Oct. 22, 2024

(54) DRIVING ASSISTANCE APPARATUS

(71) Applicant: TOYOTA JIDOSHA KABUSHIKI KAISHA, Toyota (JP)

(72) Inventor: Ryu Hatakeyama, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 264 days.

(21) Appl. No.: 17/899,824

(22) Filed: Aug. 31, 2022

(65) Prior Publication Data
US 2023/0099886 A1 Mar. 30, 2023

(30) Foreign Application Priority Data
Sep. 21, 2021 (JP) ................................. 2021-153135

(51) Int. Cl.
*B62D 15/02* (2006.01)

(52) U.S. Cl.
CPC ............................... *B62D 15/0255* (2013.01)

(58) Field of Classification Search
CPC ..... B62D 15/0255; B62D 6/00; B60W 10/20; B60W 2510/20
USPC ......................................................... 701/41
See application file for complete search history.

(56) References Cited

U.S. PATENT DOCUMENTS

| 2017/0235307 A1 | 8/2017 | Asakura et al. |
| 2021/0237739 A1 | 8/2021 | Hayakawa et al. |

FOREIGN PATENT DOCUMENTS

| JP | 2010-152732 A | 7/2010 | | |
| JP | 2017-146653 A | 8/2017 | | |
| JP | 2018-181272 A | 11/2018 | | |
| JP | 2019-123299 A | 7/2019 | | |
| JP | 2021-091282 A | 6/2021 | | |
| WO | WO 2011380327 | * | 5/2014 | ............ B62D 53/00 |
| WO | 2020/035896 A1 | 2/2020 | | |

* cited by examiner

*Primary Examiner* — Hai H Huynh
(74) *Attorney, Agent, or Firm* — Dinsmore & Shohl LLP

(57) ABSTRACT

A driving assistance apparatus includes a surrounding information acquisition device configured to acquire information on a three-dimensional object present in surroundings of a vehicle and a lane marking extending in front of the vehicle as surrounding information, a vehicle speed detection device, and a control unit configured to execute, as a steering assist control, a lane tracing assist control and a lane changing assist control, in which the control unit is configured to determine whether or not a tow condition that is satisfied in a case where a towed vehicle is coupled to the vehicle is satisfied, based on the surrounding information and vehicle speed, and make a lane change time longer in a case where a tow condition is satisfied when a start condition of the lane changing assist control is satisfied than a case where the tow condition is not satisfied.

5 Claims, 5 Drawing Sheets

DRIVING ASSISTANCE APPARATUS

CROSS-REFERENCE TO RELATED APPLICATION

This application claims priority to Japanese Patent Application No. 2021-153135 filed on Sep. 21, 2021, incorporated herein by reference in its entirety.

BACKGROUND

1. Technical Field

The present disclosure relates to a driving assistance apparatus capable of executing a steering assist control such that a vehicle to which a towed vehicle is coupled smoothly changes lanes.

2. Description of Related Art

In the related art, there has been known a driving assistance apparatus that is mounted on a vehicle and can execute a steering assist control that assists a steering operation of a driver of the vehicle. The steering assist control includes a lane tracing assist control (LTA) and a lane changing assist control (LCA). The lane tracing assist control is a control of assisting the steering operation such that a traveling position of the vehicle is maintained at a predetermined position (typically, a center position) in a lane width direction of a lane. The lane changing assist control is a control of assisting the steering operation such that the vehicle moves from an original lane in which the vehicle currently travels to a target lane adjacent to the original lane. In the following, the vehicle on which the driving assistance apparatus is mounted is also referred to as "host vehicle". In addition, the lane tracing assist control and the lane changing assist control are also referred to as "LTA" and "LCA", respectively.

The driving assistance apparatus starts the LCA in a case where a predetermined start condition is satisfied, and terminates the LCA in a case where the host vehicle completes the movement to the target lane. The start condition of the LCA includes that the LTA is being executed. Therefore, in a case where the start condition of the LCA is satisfied, the LTA is switched to the LCA, and in a case where the host vehicle completes the movement to the target lane, the LCA is terminated, and the LTA is restarted. That is, the lane is changed by the LCA and the LTA.

A towed vehicle can be coupled to the vehicle by using a predetermined coupler (typically, a hitch ball and a hitch coupler). The towed vehicle is a camping trailer or a boat trailer, for example. In a case where the towed vehicle is coupled to the host vehicle, the weight of the entire vehicle (that is, the host vehicle and the towed vehicle) is increased and a total length of the entire vehicle is made longer. Therefore, in a case where the host vehicle travels in a state where the towed vehicle is coupled, a turning characteristic is significantly changed as compared with a case where the host vehicle travels alone. Here, since the LCA and the LTA are designed to realize a smooth lane change based on the weight and the total length of the host vehicle alone, in a case where a normal lane change is executed in a state where the towed vehicle is coupled, there is a problem that the entire vehicle sways or the cancellation of the LCA occurs due to inappropriate execution of the LCA.

Japanese Unexamined Patent Application Publication No. 2019-123299 (JP 2019-123299 A) discloses a technology of a driving assistance apparatus that can execute autonomous driving, in which a host vehicle changes lanes by autonomous driving in a state where a towed vehicle is coupled (hereinafter, also simply referred to as "towing state").

SUMMARY

JP 2019-123299 A solely discloses that a burden on a driver is reduced by not switching from autonomous driving to manual driving when a host vehicle changes lanes in a towing state, and does not makes sufficient consideration how to consider a change in a turning characteristic when the host vehicle changes the lanes by autonomous driving in the towing state and to change the lanes.

The present disclosure has been made to address the problem described above. That is, the present disclosure is to provide a driving assistance apparatus capable of executing a steering assist control such that the entire vehicle smoothly changes the lanes even in a case where the vehicle travels in a state where the towed vehicle is coupled.

An aspect of the present disclosure relates to a driving assistance apparatus (hereinafter, referred to as "present disclosure apparatus") mounted on a vehicle (V). The present disclosure apparatus includes a surrounding information acquisition device (11), a vehicle speed detection device (12), and a control unit (10). The surrounding information acquisition device (11) is configured to detect a three-dimensional object present in surroundings of the vehicle and a lane marking extending in front of the vehicle to acquire information on the detected three-dimensional object and lane marking as surrounding information. The vehicle speed detection device (12) is configured to detect speed (v) of the vehicle. The control unit (10) is configured to execute, as a steering assist control of assisting a steering operation of a driver of the vehicle, a lane tracing assist control (LTA) of assisting the steering operation such that a traveling position of the vehicle is maintained at a predetermined position in a lane width direction of a lane based on the surrounding information, and a lane changing assist control (LCA) of assisting the steering operation such that the vehicle moves from an original lane (L1) in which the vehicle currently travels to a target lane (L2) adjacent to the original lane based on the surrounding information. The control unit (10) is configured to start the lane changing assist control in a case where a predetermined start condition including execution of the lane tracing assist control (condition 1b) is satisfied and terminate the lane changing assist control at a point in time when movement to the target lane is completed. The control unit (10) is configured to restart the lane tracing assist control at a point in time when the lane changing assist control is terminated.

In a case where a time needed for the vehicle to move from a predetermined position of the original lane in the lane width direction to a predetermined position of the target lane in the lane width direction by the lane changing assist control and the lane tracing assist control is defined as a lane change time (T), the control unit is configured to determine whether or not a tow condition that is satisfied in a case where a towed vehicle is coupled to the vehicle is satisfied, based on the surrounding information and the speed of the vehicle (step S420), and make the lane change time longer (step S460) in a case where the tow condition is satisfied when the start condition of the lane changing assist control is satisfied (step S440: Yes) than a case where the tow condition is not satisfied (step S440: No).

In the present disclosure apparatus, the lane change time is longer in a case where the tow condition is satisfied when the start condition of the lane changing assist control is satisfied than a case where the tow condition is not satisfied. As a result, the speed of the vehicle in the lane width direction when the vehicle changes the lanes is reduced. In addition, since a traveling track of the vehicle is longer in an extending direction of the lane (direction orthogonal to the lane width direction) as the lane change time is longer, a shape of the traveling track is gentle and a change rate of a yaw angle (that is, yaw rate) of the vehicle when the vehicle changes the lanes is reduced. With this configuration, the vehicle in the towing state can change the lanes more slowly over time than the vehicle in a state where the vehicle travels alone. Therefore, even in a case where the weight of the entire vehicle is increased and the total length of the entire vehicle is made longer by coupling the towed vehicle to the vehicle, a situation in which the entire vehicle sways is less likely to occur. In addition, since the lane changing assist control is appropriately executed, the cancellation of the control is less likely to occur. As a result, with the present disclosure apparatus, the steering assist control can be executed such that the entire vehicle smoothly changes the lanes even in a case where the vehicle travels in a state where the towed vehicle is coupled.

According to the aspect of the present disclosure, the control unit (10) may be configured to make a specific time (Ts) that is a time in the lane change time (T) needed for the vehicle (V) to move from the original lane (L1) to the target lane (L2) in the lane width direction longer in a case where the tow condition is satisfied when the start condition of the lane changing assist control (LCA) is satisfied (step S440: Yes) than a case where the tow condition is not satisfied (step S440: No).

In a case where the towed vehicle is coupled to the vehicle, a significant change in the turning characteristic occurs. For this reason, swaying of the vehicle due to coupling of the towed vehicle is more likely to occur in a case where the vehicle moves from the original lane to the target lane in the lane width direction than a case where the vehicle travels along the lane. Therefore, by making the specific time of the lane change time that is the "time needed for the vehicle to move from the original lane to the target lane in the lane width direction" longer, swaying of the vehicle in the towing state when the vehicle changes the lanes can be effectively suppressed.

According to the aspect of the present disclosure, the control unit (10) may be configured to determine that the movement to the target lane is completed at a point in time (tn5, tt5) when the vehicle (V) terminates crossing the lane marking (WL) at a boundary between the original lane (L1) and the target lane (L2) by the lane changing assist control (LCA) to terminate the lane changing assist control.

According to the aspect of the present disclosure, the control unit (10) may be configured to determine that the tow condition is satisfied (step S540) in a case where the speed (v) of the vehicle (V) is equal to or more than a predetermined speed threshold value (vth), speed (vr) of a rear three-dimensional object that is a three-dimensional object detected behind the vehicle by the surrounding information acquisition device (11) is substantially the same as the speed of the vehicle, and at least a part of the rear three-dimensional object is present in a predetermined first rear region (R1) defined behind the vehicle.

With this configuration, by setting the speed threshold value of the vehicle to an appropriate value and appropriately setting a position and a size of the first rear region, it is possible to accurately discriminate whether the rear three-dimensional object is the towed vehicle, a following vehicle, or another vehicle that travels in an adjacent lane. As a result, the reliability of the tow condition can be guaranteed.

According to the aspect of the present disclosure, the control unit (10) may be configured to determine that the tow condition is satisfied in a case where the speed (v) of the vehicle (V) is equal to or more than a predetermined speed threshold value (vth) and at least a part of a rear three-dimensional object that is a three-dimensional object detected behind the vehicle is present in a predetermined second rear region (R2) defined behind the vehicle.

With this configuration, by setting the speed threshold value of the vehicle to an appropriate value and appropriately setting a position and a size of the second rear region, even in a case where a determination is not made as to whether or not the speed of the rear three-dimensional object is substantially the same as the speed of the vehicle, it is possible to accurately discriminate whether the rear three-dimensional object is the towed vehicle, the following vehicle, or another vehicle that travels in the adjacent lane. As a result, the reliability of the tow condition can be guaranteed. Note that a length of the second rear region in a front-rear direction of the vehicle is usually shorter than a length of the first rear region in the same direction.

In the above description, in order to help the understanding of the disclosure, the reference numerals used in the embodiment are attached in parentheses to the constituent elements of the disclosure corresponding to the embodiment, but each constituent element of the disclosure is not limited to the embodiment defined by reference numerals.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration

Figure 1:
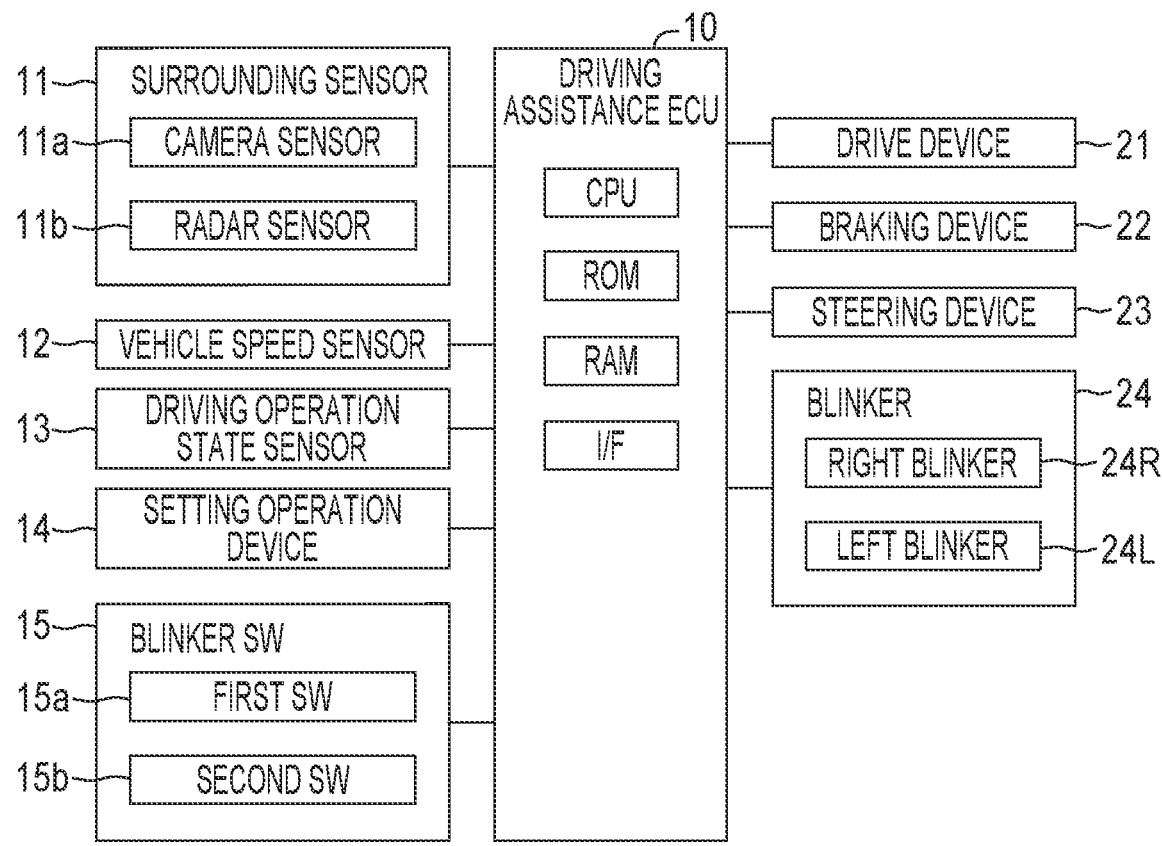
FIG. 1 is a schematic configuration diagram of a driving assistance apparatus (present embodiment apparatus) according to an embodiment of the present disclosure.

In the following, a driving assistance apparatus (hereinafter, also referred to as "present embodiment apparatus") according to an embodiment of the present disclosure will be described with reference to the drawings. As shown in FIG. 1, the present embodiment apparatus includes a driving assistance ECU 10, and a surrounding sensor 11, a vehicle speed sensor 12, a driving operation state sensor 13, a setting operation device 14, a blinker switch (blinker SW) 15, a drive device 21, a braking device 22, a steering device 23, and a blinker 24 connected to the driving assistance ECU 10. The driving assistance ECU 10 includes a microcomputer as a main part. ECU is an abbreviation for electronic control unit. The microcomputer includes a CPU, a ROM, a RAM, an interface (I/F), and the like, and the CPU realizes various functions by executing instructions (programs and routines) stored in the ROM. Note that a part of these functions may be executed by another ECU (not shown). In the following, the vehicle on which the present embodiment apparatus is mounted will be referred to as "host vehicle".

The driving assistance ECU 10 is configured to acquire signals output, detected, or generated by the elements 11 to 15 each time a predetermined time elapses to control the elements 21 to 24 based on the acquired signals. In the following, the driving assistance ECU 10 is also simply referred to as "ECU 10".

The surrounding sensor 11 (surrounding information acquisition device) includes a camera sensor 11a and a radar sensor 11b.

The camera sensor 11a is installed on a back surface of an inner rear-view mirror (windshield rear-view mirror/rear-view mirror) of the host vehicle. The camera sensor 11a images the scenery in front of the host vehicle (including front lateral side) and recognizes a lane marking based on the captured image data. The lane marking is a line marked on a road to divide the passage of vehicles by direction. The lane marking includes a solid lane marking and a dashed lane marking. The solid lane marking is a lane marking that is continuously marked on the road and includes a white lane marking and a yellow lane marking. The dashed lane marking is a lane marking intermittently marked on the road at a predetermined interval and includes a white lane marking. In the present specification, a region between two adjacent lane markings is defined as a lane. The camera sensor 11a calculates a shape of the lane based on the recognized lane marking.

In addition, the camera sensor 11a calculates the presence or absence of a three-dimensional object and a relative relationship between the host vehicle and the three-dimensional object based on the image data. The three-dimensional object includes a moving object (another vehicle) and a fixed object (guardrail, side wall, median, roadside tree, or the like). Note that the "moving object" means an object that can move, and does not mean an object that always moves. In addition, the "relative relationship between the host vehicle and the three-dimensional object" means a distance from the host vehicle to the three-dimensional object, an orientation of the three-dimensional object to the host vehicle, relative speed of the three-dimensional object to the host vehicle, and the like.

That is, the camera sensor 11a has a function of detecting "a three-dimensional object present in front of the host vehicle and a lane marking extending in front of the host vehicle" to acquire information on the detected three-dimensional object and lane marking. Note that the "lane marking extending in front of the host vehicle" also includes right and left lane markings that define a right adjacent lane and a left adjacent lane, respectively (adjacent lanes on the right and left sides, respectively, of a traveling lane on which the host vehicle currently travels).

The radar sensor 11b is installed at each of right and left corners of a rear bumper of the host vehicle. The radar sensor 11b emits radio waves in a millimeter wave band behind (including rear lateral side) the host vehicle, and receives a reflected wave from the three-dimensional object in a case where the three-dimensional object is present. The radar sensor 11b calculates the presence or absence of the three-dimensional object and the relative relationship between the host vehicle and the three-dimensional object based on an irradiation timing and a reception timing of the radio wave.

That is, the radar sensor 11b has a function of detecting "a three-dimensional object present behind the host vehicle" to acquire information on the detected three-dimensional object. Note that, instead of or in addition to the radar sensor 11b, another sensor (for example, a camera sensor for panoramic view monitor (PVM), a clearance sonar, or a laser radar) may be adopted.

The information acquired by the surrounding sensor 11 (information on the three-dimensional object present in surroundings of the host vehicle and the lane marking extending in front of the host vehicle) is referred to as surrounding information. The surrounding sensor 11 outputs the surrounding information to the ECU 10.

The vehicle speed sensor 12 (vehicle speed detection device) detects the speed (vehicle speed) of the host vehicle.

The driving operation state sensor 13 includes a plurality of sensors that detects a driving operation state. Specifically, the driving operation state sensor 13 includes a steering angle sensor that detects a steering angle of a steering wheel, a steering torque sensor that detects a steering torque, and the like.

The setting operation device 14 is an operation device operated by a driver to set (select) whether or not the driver desires to execute each of an adaptive cruise control (hereinafter, also referred to as "ACC"), a lane tracing assist control (LTA), and a lane changing assist control (LCA). The setting operation device 14 generates an ACC on signal in a case where the execution of the ACC is selected, generates an LTA on signal in a case where the execution of the LTA is selected, and generates an LCA on signal in a case where the execution of the LCA is selected.

In addition, the setting operation device 14 also functions as an operation device that decides a set distance and a set vehicle speed (both described below) of the ACC.

Note that the setting operation device 14 is configured not to select the execution of the LTA and the LCA in a case where the execution of the ACC is not selected, and not to select the execution of the LCA in a case where the execution of the LTA is not selected.

The blinker SW 15 is provided on a blinker lever (not shown). The blinker lever is an operation device operated by the driver to operate (turn on) the blinker 24, and is provided on a steering column (component of a steering mechanism described below). In the present embodiment, the blinker lever is operated in a case where the driver makes a right or a left turn, or changes the lanes by his/her own driving operation, and is also operated in a case where the driver desires to execute the LCA (that is, execute the lane change).

Specifically, the blinker lever is configured to move to a first right position or a first left position that is a position rotated clockwise or counterclockwise by a predetermined angle $\theta 1$ from a neutral position around a support shaft. In addition, the blinker lever is configured to move to a second right position or a second left position that is a position rotated clockwise or counterclockwise by a predetermined angle $\theta 2$ larger than the angle $\theta 1$ from the neutral position around the support shaft. In the following, in a case where the distinction is not needed, the first right position and the first left position are collectively referred to as "first position", and in a case where the distinction is not needed, the second right position and the second left position are collectively referred to as "second position".

In a case where the blinker lever is moved to the first position by a lever operation of the driver, the blinker lever is returned to the neutral position when lever operation force of the driver is released.

On the other hand, in a case where the blinker lever is moved to the second position by the lever operation of the driver, the blinker lever is held at the second position by a lock mechanism even when the lever operation force is released. In a state where the blinker lever is held at the second position, in a case where the steering wheel is rotated in a reverse direction to be returned to the neutral position, or in a case where the driver executes an operation to move the blinker lever toward the neutral position, the lock by the lock mechanism is released and the blinker lever is returned to the neutral position.

The blinker SW 15 has a first SW 15a and a second SW 15b. The first SW 15a includes a first right SW 15aR that is turned on (generates an on signal) solely in a case where the blinker lever is positioned at the first right position, and a first left SW 15aL that is turned on (generates an on signal) solely in a case where the blinker lever is positioned at the first left position. The second SW 15b includes a second right SW 15bR that is turned on (generates an on signal) solely in a case where the blinker lever is positioned at the second right position, and a second left SW 15bL that is turned on (generates an on signal) solely in a case where the blinker lever is positioned at the second left position.

The ECU 10 detects an operation state of the blinker lever based on the presence or absence of the on signal from the first SW 15a and the second SW 15b. Then, based on the operation state of the blinker lever, the ECU 10 turns on and off the blinker 24 corresponding to an operation direction of the blinker lever (described below).

In a case where the driver makes a right or a left turn, or changes the lanes by his/her own driving operation, the driver causes the blinker lever to move to the second left position or the second right position.

On the other hand, in a case where the driver desires to execute the LCA (execute the lane change), the driver causes the blinker lever to move to the first position (strictly speaking, the first position corresponding to a desired direction of the LCA out of the first right position and the first left position), and holds the blinker lever in that state. The ECU 10 is configured to measure a time during which the blinker lever remains held at the first position. In a case where a holding time of the blinker lever is equal to or longer than a predetermined time (hereinafter, also referred to as "LCA request confirmation time"), the ECU 10 determines that an LCA request signal is issued from the first SW 15a. The LCA request confirmation time is 1 second, for example. That is, in a case where the driver desires to execute the LCA, the driver need only hold the blinker lever at the first position for a time equal to or longer than the LCA request confirmation time.

Note that the operation device operated by the driver in a case where the execution of the LCA is desired is not limited to the blinker lever, and for example, a dedicated operation device may be provided.

The drive device 21 is a device that applies drive force for causing the host vehicle to travel to drive wheels of the host vehicle. For example, in a case where the host vehicle is a hybrid electric vehicle, a drive source of the drive device 21 is an engine and a motor. The ECU 10 controls the operation of the drive device 21 to control the drive force applied to the drive wheels. Note that a type of the host vehicle is not limited to the hybrid electric vehicle, and may be, for example, an engine vehicle, a plug-in hybrid electric vehicle, a fuel cell electric vehicle, and a battery electric vehicle.

The braking device 22 is a device that applies braking force for braking the host vehicle to wheels of the host vehicle. The ECU 10 controls the operation of the braking device 22 to control the braking force applied to the wheels.

The steering device 23 is a device that applies the steering torque for turning the turning wheels of the host vehicle to the steering mechanism. Specifically, the steering device 23 includes a motor driver (not shown) and a turning motor connected to the motor driver. The turning motor is incorporated in the steering mechanism. The turning motor generates the steering torque by the electric power supplied from the motor driver, and applies this steering torque to the steering mechanism. The ECU 10 controls the operation of the steering device 23 to control the steering torque (consequently, a turning angle of the turning wheels) applied to the steering mechanism.

The blinker 24 includes a right blinker 24R and a left blinker 24L. The left blinker 24L is installed at each of a left front corner and a left rear corner of the host vehicle. The right blinker 24R is installed at each of a right front corner and a right rear corner of the host vehicle. The ECU 10 turns on and off the corresponding blinker 24 during a period during which the blinker lever is positioned at the first position or the second position (that is, during a period during which the first SW 15a or the second SW 15b generates the on signal).

In addition, in a case where a start condition of the LCA described below is satisfied and the LCA is started, the ECU 10 starts turning on and off the corresponding blinker 24 and turns on and off the blinker 24 during a period during which the LCA is executed.

That is, the ECU 10 turns on and off the corresponding blinker 24 during a period during which at least one of a condition A that the blinker lever is positioned at the first position or the second position and a condition B that the LCA is executed is satisfied, and terminates turning on and off (turns off) the blinker 24 at a point in time when none of these conditions are satisfied. With this configuration, once the LCA is started, even in a case where the blinker lever is returned from the first position to the neutral position, the ECU 10 continues turning on and off the blinker 24 during the period during which the LCA is executed (stated another way, until the LCA is terminated).

Note that, in the condition B, instead of the condition described above, a condition that "a predetermined time (for example, 0.5 seconds) elapses since the host vehicle terminates crossing the lane marking at the boundary between the original lane and the target lane by the LCA" may be adopted. With this configuration, in a case where the blinker lever is positioned at the neutral position after the start of the LCA, the ECU 10 turns off the blinker 24 at a point in time when the predetermined time elapses since the LCA is terminated. That is, a timing of turning off the blinker 24 may not be the same as a timing of terminating the LCA.

Details of Operation

Next, the details of the operation of the ECU 10 will be described. The ECU 10 is configured to execute the ACC, the LTA, and the LCA. All of these controls are well known. As will be described in detail below, the ECU 10 is configured to execute the lane change by the LCA and the LTA. Since the present embodiment apparatus is characterized by changing behavior of the lane change based on whether or not a towed vehicle is coupled to the host vehicle, a control related to the feature part will be described in detail below, and other controls will be described solely in outline. Note that the LTA and the LCA are types of the steering assist control.

ACC

In a case where the ACC on signal is acquired from the setting operation device 14, the ECU 10 executes the ACC. Specifically, the ECU 10 determines the presence or absence of a preceding vehicle based on the surrounding information. In a case where the ECU 10 determines that the preceding vehicle is present, the ECU 10 controls the vehicle speed such that an inter-vehicle distance from the preceding vehicle is maintained at a predetermined set distance. On the other hand, in a case where the ECU 10 determines that the preceding vehicle is not present, the ECU 10 controls the vehicle speed such that the host vehicle travels at a predetermined set vehicle speed. It is possible to change the set distance and the set vehicle speed within a predetermined range by the driver operating the setting operation device 14.

LTA

In a case where a start condition of the LTA is satisfied, the ECU 10 starts the LTA. The start condition of the LTA is satisfied, for example, in a case where all of the following conditions are satisfied.

(Condition 1a) The ACC is executed.

(Condition 2a) The LTA on signal is acquired from the setting operation device 14.

(Condition 3a) The surrounding information includes the lane marking that defines the traveling lane.

Note that any condition may be added instead of or in addition to the conditions described above.

In a case where the start condition of the LTA is satisfied, the ECU 10 controls the steering device 23 such that a traveling position of the host vehicle is maintained at a center position of the traveling lane in a lane width direction (hereinafter, also referred to as "lateral direction") (stated another way, such that the host vehicle travels along a center line of the traveling lane). Here, "the traveling position of the host vehicle is maintained at the center position of the traveling lane in the lateral direction" means that "the host vehicle is positioned at the center of the traveling lane in the lateral direction and the yaw angle (angle formed by a front-rear axis of the host vehicle with the center line of the traveling lane) is maintained at substantially zero". That is, during the execution of the LTA, the ECU 10 sets a target yaw angle to zero while calculating the center position of the traveling lane in the lateral direction based on the surrounding information, calculates a target turning angle such that the host vehicle is positioned at the center position and the yaw angle matches the target yaw angle, and controls the steering device 23 such that the steering torque at which the turning angle of the turning wheels matches the target turning angle is applied to the steering mechanism. Note that the "center line" is an imaginary line that passes through the center position of the lane in the lateral direction and extends in an extending direction of the lane, and can be calculated by the ECU 10 based on the surrounding information. In the following, the "center position of the lane in the lateral direction" is also simply referred to as the "center position of the lane". In the present embodiment, the traveling position of the host vehicle is maintained at the center position of the traveling lane by the LTA, but the position at which the traveling position of the host vehicle is maintained in the traveling lane is not limited to the center position.

LCA

In a case where the start condition of the LCA is satisfied, the ECU 10 starts the LCA. The start condition of the LCA is satisfied, for example, in a case where all of the following conditions are satisfied.

(Condition 1b) The LTA is executed.

(Condition 2b) The LCA on signal is acquired from the setting operation device 14.

(Condition 3b) The LCA request signal is acquired from the first SW 15*a*.

(Condition 4b) The lane marking in the operation direction of the blinker lever included in the surrounding information (that is, a boundary lane marking that is the lane marking as the boundary between the original lane and the target lane) is a white dashed lane marking.

(Condition 5b) The surrounding information does not include the three-dimensional object (typically, another vehicle) that has a possibility of hindering the movement to the target lane.

(Condition 6b) The vehicle speed of the host vehicle is within a predetermined LCA vehicle speed range (for example, equal to or more than 60 km/h and equal to or less than 130 km/h).

(Condition 7b) The road on which the host vehicle travels is an expressway.

Whether or not the condition 7b is satisfied can be determined based on, for example, road type information acquired from a navigation system (not shown). Note that any condition may be added instead of or in addition to the conditions described above. For example, the condition that "a hands-free warning is not issued during the execution of the LTA" may be added. Note that the hands-free warning is a warning that is executed in a case where the driver does not hold the steering wheel, and can be executed, for example, by sounding a buzzer.

In a case where the start condition of the LCA is satisfied, the ECU 10 controls the steering device 23 such that the host vehicle moves from the original lane to the target lane (lane adjacent to the original lane on the operation direction side of the blinker lever). At a point in time when the host vehicle terminates crossing the boundary lane marking (described below), the ECU 10 determines that the movement of the host vehicle to the target lane is completed, terminates the LCA, and restarts the LTA at the point in time. That is, at the point in time when the LCA is terminated (at the point in time when the LTA is restarted), the host vehicle is not yet positioned at the center position of the target lane, and the yaw angle of the host vehicle deviates from the target yaw angle. By restarting the LTA, the host vehicle moves to the center position of the target lane, and the traveling position is maintained at the center position.

In the present specification, the movement of the host vehicle during a period from "a point in time when the start condition of the LCA is satisfied in the original lane" to "a point in time when the LCA is terminated, the LTA is restarted, and the traveling position of the host vehicle is moved to the center position of the target lane (traveling lane) in the target lane" is defined as "lane change from the original lane to the target lane". That is, the lane change is an operation realized by a combination of "an operation of the host vehicle moving from the original lane to the target lane by the LCA" and "an operation of the host vehicle moving to the center position of the target lane by the LTA". In addition, the time needed for the host vehicle to change the lanes by the LCA and the LTA is defined as "lane change time T".

Figure 2:
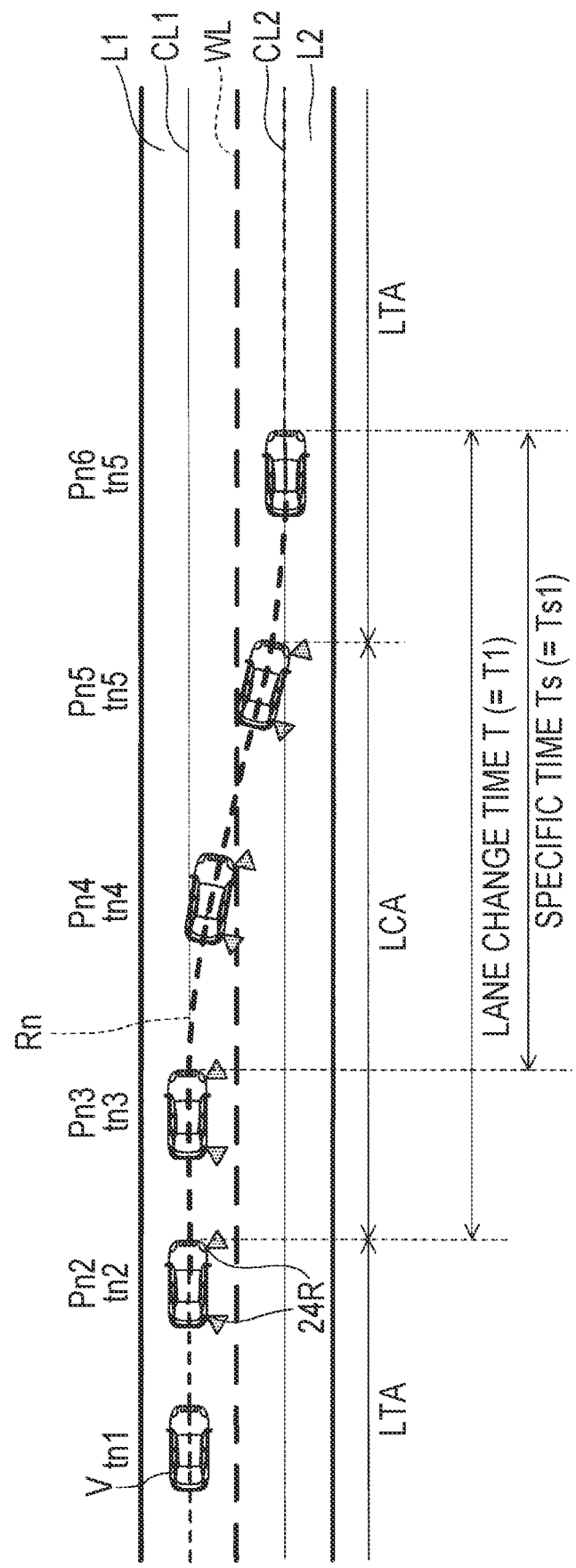
FIG. 2 is a diagram showing a state where a host vehicle that travels alone changes lanes by an LCA and an LTA.

The description will be made in more detail with reference to FIG. 2. FIG. 2 is a diagram showing a state where a host vehicle V changes the lanes from a lane L1 (original lane) to a lane L2 (target lane) by the LCA and the LTA. Each of point in time tn1 to point in time tn6 represents a specific point in time. Point in time tnk+1 (integer from k: 1 to 5) is a point in time after point in time tnk. In this example, it is assumed that, at point in time tn1, the LTA is executed (that is, the host vehicle V travels along a center line CL1 of the lane L1), the setting operation device 14 generates the LCA on signal, and the host vehicle V travels on the expressway at fixed speed at the vehicle speed within the LCA vehicle speed range. In addition, as shown in FIG. 2, a boundary lane marking WL is the white dashed lane marking. Further, the three-dimensional object that has a possibility of hindering the movement to the lane L2 is not present. Therefore, the conditions 1b, 2b, 4b to 7b are satisfied at point in time tn1.

The driver moves the blinker lever to the first right position at point in time tn1 and holds that state. As a result, the ECU 10 determines that the condition A is satisfied, and starts turning on and off the right blinker 24R at point in time tn1. When the holding time reaches the LCA request confirmation time at point in time tn2, the condition 3b is satisfied. In a case where the conditions 1b, 2b, 4b to 7b that are satisfied at point in time tn1 are still satisfied at point in time tn2, the start condition of the LCA is satisfied in a case where all of the conditions 1b to 7b are satisfied at point in time tn2, ECU 10 starts the LCA at point in time tn2. In this example, it is assumed that the blinker lever is returned to the neutral position after the LCA is started. In this case, after the LCA is started, the ECU 10 determines that the condition B is satisfied and continues turning on and off the right blinker 24R.

In a case where the LCA is started, the ECU 10 sets (selects) lane change time T based on various conditions (for example, the surrounding information and a vehicle state) from a predetermined time range. In a case where the host vehicle V travels alone (the host vehicle V travels in a state where the towed vehicle is not coupled) as in the example of FIG. 2, the ECU 10 sets time T1 as lane change time T. Then, the ECU 10 calculates the traveling track Rn based on the vehicle speed, lane change time T (=T1), and an inter-lane distance (distance between the center line CL1 of the lane L1 and a center line CL2 of the lane L2). The traveling track Rn is a track on which the host vehicle V moves from the center position of the lane L1 to the center position of the lane L2 over lane change time T (=T1). The lane change is executed by the host vehicle V moving along the traveling track Rn from a start point to an end point of the traveling track Rn. As is clear from the above description, in a case where the LCA is started, the ECU 10 sets lane change time T and calculates the traveling track Rn, thereby starting the lane change.

Each time a predetermined time elapses, the ECU 10 calculates lateral speed (vehicle speed in the lateral direction) and the yaw angle for causing the host vehicle V to move along the traveling track Rn as target lateral speed and the target yaw angle, respectively. Then, the steering device 23 is controlled such that the lateral speed and the yaw angle of the host vehicle V match the target lateral speed and the target yaw angle.

A point Pn2 to a point Pn6 are points on the traveling track Rn. The point Pn2 and the point Pn6 are positioned at the start point and the end point of the traveling track Rn, respectively. The traveling track Rn substantially matches the center line CL1 in a section from the point Pn2 to the point Pn3, and is smoothly displaced from the center line CL1 to the center line CL2 in a section from the point Pn3 to the point Pn6. Further, the point Pn4 is a point at which the wheel on the right front side of the host vehicle V approaches the boundary lane marking WL, and the point Pn5 is a point immediately behind the wheel on the left rear side of the host vehicle V that passes through the boundary lane marking WL. The positions of the point Pn4 and the point Pn5 can be calculated based on a shape of the traveling track Rn and the shape of the host vehicle V.

Point in time tn2 to point in time tn6 correspond to the point Pn2 to the point Pn6, respectively. Therefore, in a case where the ECU 10 starts the LCA at point in time tn2, the host vehicle V travels along the traveling track Rn in the lane L1 during a period from point in time tn2 to point in time tn3, starts the movement in the lateral direction at point in time tn3, starts crossing the boundary lane marking WL at point in time tn4, and terminates crossing the boundary lane marking WL at point in time tn5. As a result, the ECU 10 determines that the host vehicle V completes the movement to the lane L2 at point in time tn5, terminates the LCA, turns off the right blinker 24R, and restarts the LTA. Thereafter, the host vehicle V moves along the traveling track Rn, and terminates the movement in the lateral direction at point in time tn6. That is, at point in time tn6, the traveling position of the host vehicle V is moved to the center position of the lane L2. The movement of the host vehicle V during a period from point in time tn2 to point in time tn6 corresponds to the lane change (T1=tn6−tn2). Note that the host vehicle V moves in the lateral direction from the lane L1 to the lane L2 during a period from point in time tn3 to point in time tn6. In the following, a time needed for the host vehicle V to move from the lane L1 to the lane L2 in the lateral direction is defined as "specific time Ts". Specific time Ts is included in lane change time T. In the example of FIG. 2, the ECU 10 sets time Ts1 as specific time Ts (Ts1=tn6−tn3).

By the way, the towed vehicle can be coupled to the host vehicle by using a predetermined coupler. In a case where the towed vehicle is coupled, the weight of the entire vehicle is increased and the total length of the entire vehicle is made longer, so that the turning characteristic is significantly changed as compared with a case where the host vehicle travels alone. Therefore, in a case where a normal lane change is executed in a state where the towed vehicle coupled, there is a problem that the entire vehicle sways or the cancellation of the LCA occurs.

Therefore, the ECU 10 is configured to make a tow condition determination to determine whether or not a tow condition that is satisfied in a case where the towed vehicle is coupled to the host vehicle is satisfied, and to make lane change time T (strictly speaking, specific time Ts) longer in a case where the tow condition is satisfied than a case where the tow condition is not satisfied.

First, the tow condition will be described. The ECU 10 determines that the tow condition is satisfied in a case where all of the following conditions are satisfied.

(Condition 1c) Vehicle speed v is equal to or more than a predetermined vehicle speed threshold value vth.

(Condition 2c) Speed vr of a rear three-dimensional object (described below) included in the surrounding information is substantially the same as the vehicle speed v.

(Condition 3c) At least a part of the rear three-dimensional object that satisfies the condition 2c is present in a predetermined rear region R1.

The minimum value of the vehicle speed v that is presumed that the host vehicle is not caught in a traffic jam is set as the vehicle speed threshold value vth of the condition 1c. The vehicle speed threshold value vth can be decided in advance by an experiment or a simulation.

The rear three-dimensional object in the condition 2c is the three-dimensional object detected by the radar sensor 11b. The ECU 10 determines that the condition 2c is satisfied in a case where has a predetermined value in which the magnitude |vr−v| of a difference between the speed vr of the rear three-dimensional object and the vehicle speed v is equal to or less than a predetermined difference threshold value Av (Av: a predetermined value that can be selected from a range of 1 km/h to 2 km/h).

Here, in a case where an origin is set in the center of the front bumper of the host vehicle and an x-axis with a right direction as a positive direction and a y-axis with a front direction as a positive direction are set, the rear region R1 in the condition 3c is defined by the following expression.

$$-w/2-m \leq x \leq w/2+m$$

$$-L-d1 \leq y \leq L$$

w represents a vehicle width of the host vehicle, m represents a predetermined margin, and L represents the total length (length in the front-rear direction) of the host vehicle. That is, the rear region R1 is a rectangular region having a length in an x-axis direction of w+2 m and a length in a y-axis direction of d1, and is symmetrical with respect to the y-axis. In addition, the rear region R1 is defined to be in contact with a rear end portion behind the host vehicle. In a case where the host vehicle satisfies the condition 1c and the following vehicle or another vehicle that travels in the adjacent lane satisfies the condition 2c, the margin m and the length d1 are set to values to the extent that the following vehicle or another vehicle cannot enter the rear region R1. These values can be set by an experiment or a simulation, and in the present embodiment, the margin m can be set to 0.7 m and the length d1 can be set to 5 m. Note that the values of the margin m and the length d1 are not limited to these values.

The ECU 10 determines that the condition 3c is satisfied when at least a part of the rear three-dimensional object that satisfies the condition 2c is present in the rear region R1. Note that the rear region R1 corresponds to an example of a "first rear region".

In a case where the host vehicle travels without being caught in the traffic jam, when the rear three-dimensional object travels at the speed vr substantially the same as the vehicle speed v and at least a part of the rear three-dimensional object is present in the rear region R1, a possibility that the rear three-dimensional object is the following vehicle or another vehicle that travels in the adjacent lane is extremely low, and a possibility that the rear three-dimensional object is the towed vehicle coupled to the host vehicle is high. Therefore, since the tow condition is satisfied in a case where the conditions 1*c* to 3*c* are satisfied, it is possible to accurately determine whether or not the towed vehicle is coupled to the host vehicle.

Figure 3:
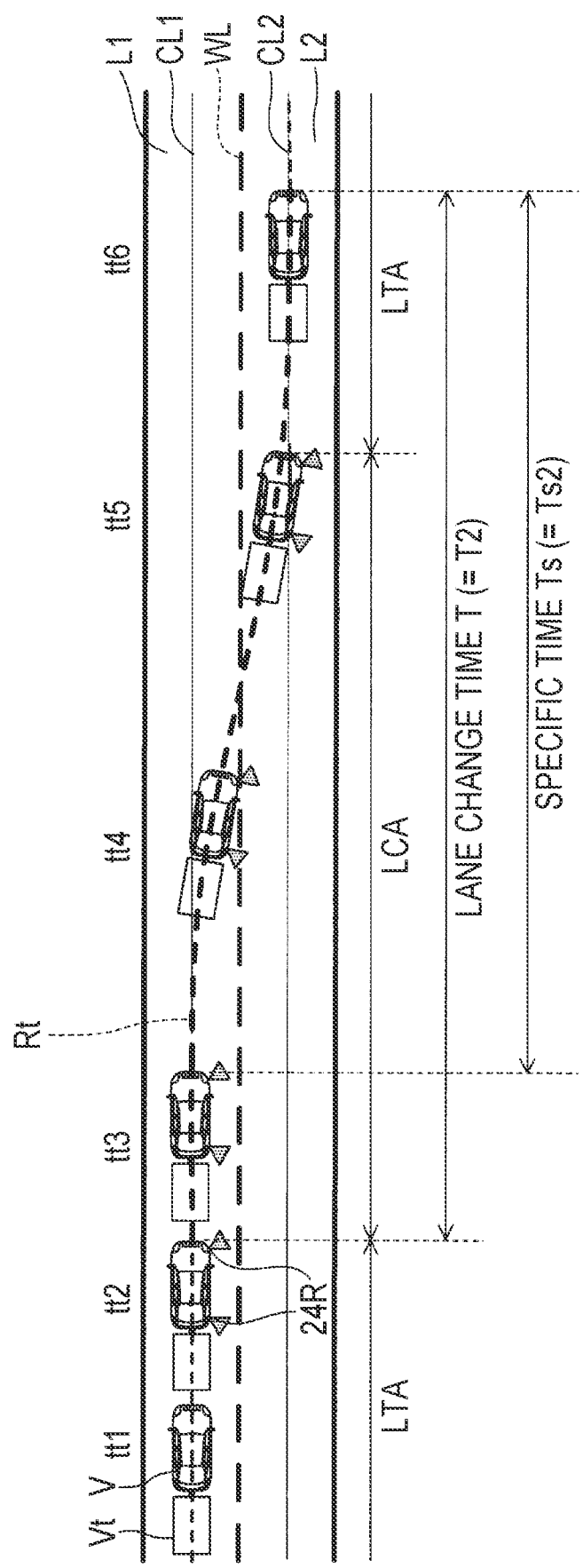
FIG. 3 is a diagram showing a state where the host vehicle to which a towed vehicle is coupled changes the lanes by the LCA and the LTA.

Subsequently, the lane change time in a case where the towed vehicle is coupled to the host vehicle will be described with reference to FIG. 3. FIG. 3 is a diagram showing a state where the host vehicle V changes the lanes from the lane L1 (original lane) to the lane L2 (target lane) in a state where a towed vehicle Vt is coupled by the LCA and the LTA. In this example, the tow condition is satisfied. Each of point in time tt1 to point in time tt6 represents a specific point in time. Point in time ttk+1 (integer from k: 1 to 5) is a point in time after point in time ttk. In the following description, the host vehicle V in the towing state may be simply referred to as "host vehicle V".

The behavior of the host vehicle V at point in time tt1 to point in time tt6 corresponds to the behavior of the host vehicle V at point in time tn1 to point in time tn6 in FIG. 2. Therefore, at point in time tt1, the blinker lever is moved to the first right position by the driver, and that state is held. Then, the holding time reaches the LCA request confirmation time at point in time tt2, and the condition 3b is satisfied (that is, the start condition of the LCA is satisfied at point in time tt2). As a result, the ECU 10 starts turning on and off the right blinker 24R at point in time tt1, starts the LCA at point in time tt2, and continues turning on and off the right blinker 24R.

In a case where the ECU 10 starts the LCA, lane change time T is set as in the example of FIG. 2. Note that since the tow condition is satisfied in this example, the ECU 10 sets time T2 that is a value larger than time T1 as lane change time T. That is, the ECU 10 is configured to make lane change time T longer in a case where the tow condition is satisfied than a case where the tow condition is not satisfied. More specifically, the ECU 10 sets time Ts2 that is a time larger than time Ts1 as specific time Ts, thereby making lane change time T longer. Note that time Ts2 may be decided by multiplying time Ts1 by a predetermined magnification. In this case, the predetermined magnification may be a variable that is increased as the vehicle speed is increased. Alternatively, time Ts2 may be decided by adding a predetermined time to time Ts1. In this case, the predetermined time may be a variable that is increased as the vehicle speed is increased.

In a case where lane change time T (=T2) is set, the ECU 10 calculates a traveling track Rt based on the vehicle speed, lane change time T, the inter-lane distance, and the like. The traveling track Rt is a track in which the host vehicle V moves from the center position of the lane L1 to the center position of the lane L2 over lane change time T (=T2). The lane change is executed by the host vehicle V moving along the traveling track Rt from a start point to an end point of the traveling track Rt.

Each time a predetermined time elapses, the ECU 10 calculates the lateral speed and the yaw angle for causing the host vehicle V to move along the traveling track Rt as the target lateral speed and the target yaw angle, respectively. Then, the steering device 23 is controlled such that the lateral speed and the yaw angle of the host vehicle V match the target lateral speed and the target yaw angle.

In a case where the ECU 10 starts the LCA at point in time tt2, the host vehicle V travels along the traveling track Rt in the lane L1 during a period from point in time tt2 to point in time tt3, starts the movement in the lateral direction at point in time tt3, starts crossing the boundary lane marking WL at point in time tt4, and terminates crossing the boundary lane marking WL at point in time tt5. As a result, the ECU 10 terminates the LCA at point in time tt5, turns off the right blinker 24R, and restarts the LTA. Thereafter, the host vehicle V moves along the traveling track Rt, and terminates the movement in the lateral direction at point in time tt6. That is, at point in time tt6, the traveling position of the host vehicle V is moved to the center position of the lane L2. The movement of the host vehicle V during a period from point in time tt2 to point in time tt6 corresponds to the lane change (T2=tt6−tt2). In addition, the period from point in time tt3 to point in time tt6 corresponds to specific time Ts (=Ts2) (Ts2=tt6−tt3).

By making specific time Ts longer, a section of the traveling track Rt corresponding to specific time Ts is longer in the extending direction of the lanes L1, L2 than the same section of the traveling track Rn (see FIG. 2). Stated another way, a shape of the traveling track Rt in the section is gentle (curvature is small).

In FIGS. 2 and 3, the inter-lane distance is the same. Therefore, by making specific time Ts longer, it is possible to reduce the lateral speed in a case where the host vehicle V travels in the section corresponding to specific time Ts in the traveling track Rt. In addition, since the traveling track Rt is longer in the extending direction of the lane, the change rate of the yaw angle (that is, the yaw rate) in a case where the host vehicle V moves from the lane L1 to the lane L2 in the lateral direction can be reduced. With this configuration, the host vehicle V in the towing state can change the lanes more slowly over time than the host vehicle V in a state where the host vehicle V travels alone. Therefore, even in a case where the weight of the entire vehicle is increased and the total length of the entire vehicle is made longer by coupling the towed vehicle Vt to the host vehicle V, a situation in which the entire vehicle sways is less likely to occur. In addition, since the LCA is appropriately executed, the cancellation of the LCA is less likely to occur. As a result, with the present embodiment apparatus, the LCA and the LTA (that is, the steering assist control) can be executed such that the entire vehicle smoothly changes the lanes even in a case where the host vehicle V travels in the towing state.

Specific Operation

Subsequently, the specific operation of the ECU 10 will be described. The CPU of the ECU 10 is configured to repeatedly execute routines shown in the flowcharts of FIGS. 4 and 5 each time a predetermined calculation time elapses during a period during which an ignition switch is positioned at an on position.

Figure 4:
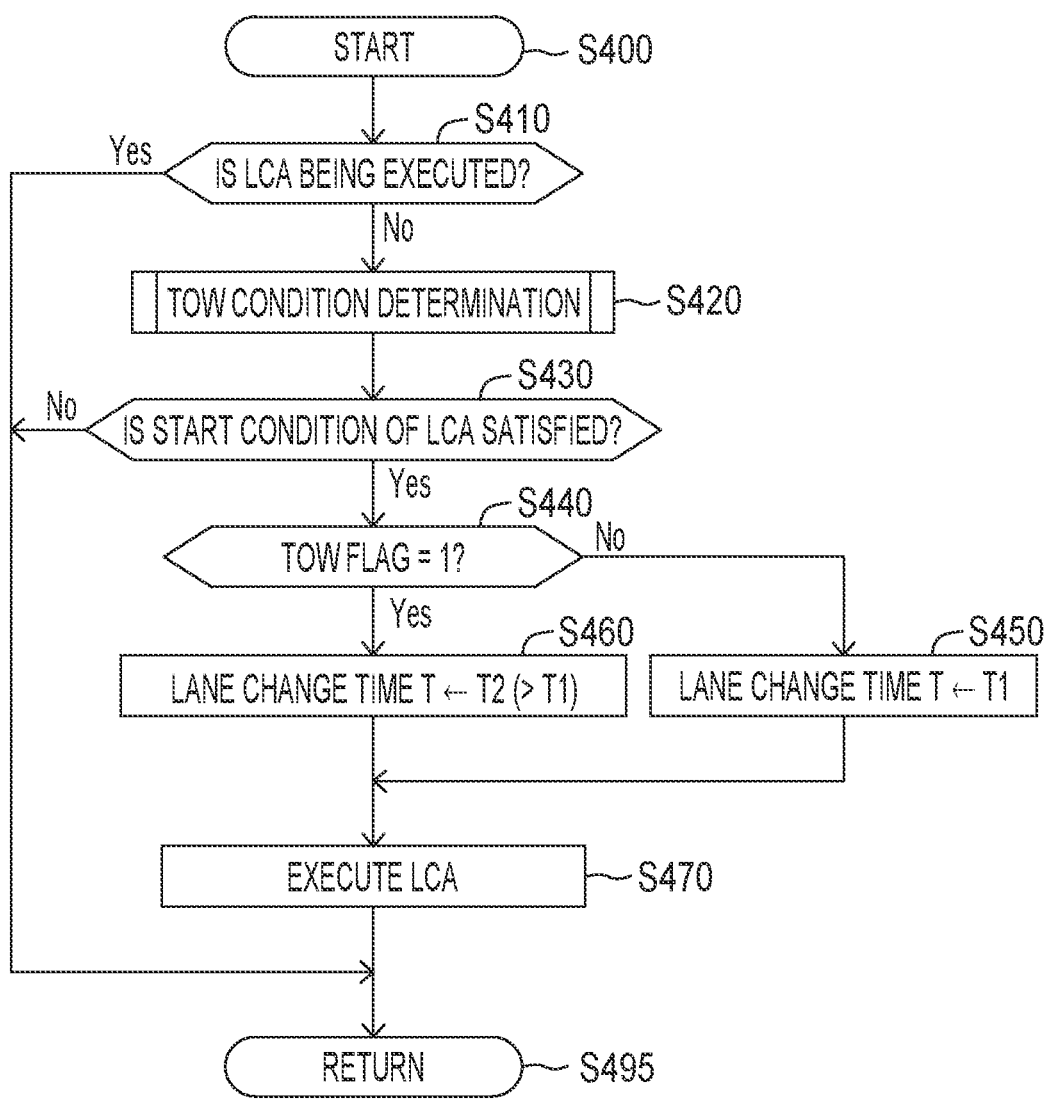
FIG. 4 is a flowchart showing a routine executed by a CPU of a driving assistance ECU of the present embodiment apparatus.

At a predetermined timing, the CPU starts a process from step S400 in FIG. 4, proceeds to step S410, and determines whether or not the LCA is being executed. In a case where the start condition of the LCA is already satisfied and the LCA is being executed, the CPU determines "Yes" in step S410, proceeds to step S495, and temporarily terminates the present routine. On the other hand, in a case where the start condition of the LCA is not satisfied and the LCA is not executed, the CPU determines "No" in step S410 and proceeds to step S420.

Figure 5:
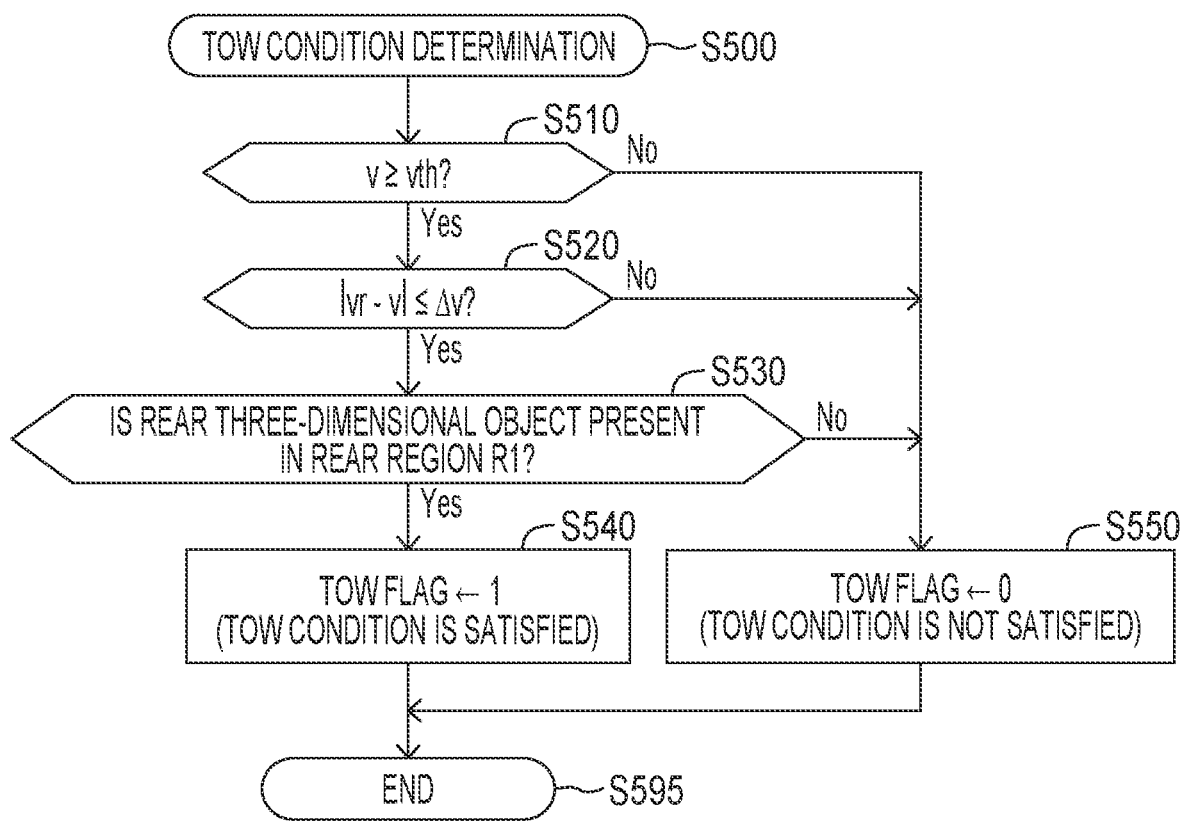
FIG. 5 is a flowchart showing a routine executed by the CPU.

In a case where the CPU proceeds to step S420, a tow condition determination process that is the routine of FIG. 5 is executed. That is, the CPU starts a process from step S500 in FIG. 5, proceeds to step S510, and determines whether or not the vehicle speed v of the host vehicle is equal to or more than the vehicle speed threshold value vth (condition 1c). In a case where v vth is satisfied, the CPU determines "Yes" in step S510 (that is, determines that the condition 1c is satisfied), and proceeds to step S520.

In step S520, the CPU determines whether or not the speed vr of the rear three-dimensional object detected based on the surrounding information is substantially the same as the vehicle speed v (that is, whether or not |vr−v|≤Δv is satisfied) (condition 2c). In a case where |vr−v| Δv is satisfied, the CPU determines "Yes" in step S520 (that is, determines that the condition 2c is satisfied), and proceeds to step S530.

In step S530, the CPU determines whether or not at least a part of the rear three-dimensional object that satisfies the condition 2c is present in the rear region R1 (condition 3c). In a case where at least a part of the rear three-dimensional object is present in the rear region R1, the CPU determines "Yes" in step S530 (that is, determines that the condition 3c is satisfied), and proceeds to step S540.

In step S540, the CPU determines that the tow condition is satisfied and sets a value of a tow flag to 1. Thereafter, the CPU proceeds to step S595 and temporarily terminates the present routine.

On the other hand, in a case where v<vth is satisfied, |vr−v|>Δv is satisfied, or in a case where the rear three-dimensional object is not present in the rear region R1, the CPU determines "No" in step S510, step S520, or step S530 (that is, determines that the condition 1c, the condition 2c, or the condition 3c is not satisfied), and proceeds to step S550.

In step S550, the CPU determines that the tow condition is not satisfied and sets the value of the tow flag to 0. Thereafter, the CPU proceeds to step S595 and temporarily terminates the present routine.

In a case where the CPU terminates the tow condition determination process in step S595, the CPU proceeds to step S430 in FIG. 4. In step S430, the CPU determines whether or not the start condition of the LCA is satisfied. In a case where the start condition of the LCA is not satisfied, the CPU determines "No" in step S430, proceeds to step S495, and temporarily terminates the present routine. On the other hand, in a case where the start condition of the LCA is satisfied, the CPU determines "Yes" in step S430 and proceeds to step S440.

In step S440, the CPU determines whether or not the value of the tow flag set by the tow condition determination in step S420 is 1. In a case where the value of the tow flag is 0, the CPU determines "No" in step S440 and proceeds to step S450. In step S450, the CPU sets lane change time T to time T1. On the other hand, in a case where the value of the tow flag is 1, the CPU determines "Yes" in step S440 and proceeds to step S460. In step S460, the CPU sets lane change time T to time T2 (>T1). That is, in a case where the tow condition is satisfied, the CPU makes lane change time T longer than a case where the tow condition is not satisfied. More specifically, the CPU makes lane change time T longer by making specific time Ts of lane change time T longer from time Ts1 to time Ts2.

In a case where the process of step S450 or step S460 is terminated, the CPU proceeds to step S470 and executes the LCA. Thereafter, the CPU proceeds to step S495 and temporarily terminates the present routine. In a case where the LCA is terminated, the LTA is restarted and the host vehicle moves to the center position of the target lane. As a result, the lane change is completed.

Although the driving assistance apparatus according to the present embodiment has been described above, the present disclosure is not limited to the embodiment described above, and various changes can be made as long as the object of the present disclosure is not deviated.

For example, the tow condition may be satisfied in a case where the condition 1c and the condition 3c are satisfied (that is, the tow condition may not include the condition 2c). In this case, the condition 3c can be satisfied in a case where at least a part of the rear three-dimensional object detected by the surrounding sensor 11 is present in a rear region R2. The rear region R2 can be defined as follows, for example.

$$-w/2-m \leq x \leq w/2+m$$

$$-L-d2 \leq y \leq -L$$

In some embodiments, a length d2 (length of the rear region R2 in the y-axis direction) may be set to a value less than the length d1 (for example, a predetermined value within a range of 1 m to 2 m). As a result, even in a case where the tow condition does not include the condition 2c, it is possible to accurately determine whether or not the towed vehicle is coupled to the host vehicle. Note that the rear region R2 corresponds to an example of a "second rear region".

In addition, in the embodiment described above, specific time Ts of lane change time T is made longer in a case where the tow condition is satisfied than a case where the tow condition is not satisfied, but specific time Ts is not limited to this configuration, for example, lane change time T may be made longer overall. That is, a time other than specific time Ts (time from point in time tn2 to point in time tn3) in the lane change time may also be made longer. Alternatively, solely a time in lane change time T needed to execute the LCA may be made longer. Note that it is desirable that a time corresponding to a section including at least a part of sections of the traveling track in which the host vehicle moves from the original lane to the target lane in the lateral direction be made longer. With this configuration, since the host vehicle can move more slowly over time in the section, it is possible to reduce a frequency at which the host vehicle to which the towed vehicle is coupled sways or the LCA is canceled in a case where the host vehicle changes the lanes.

Further, the first SW 15a may be configured to generate the LCA request signal at a point in time when the blinker lever is moved to the first position. That is, the LCA request confirmation time may not be provided.

Further, the LTA and the LCA may be executed by controlling the drive device 21 and the braking device 22 in addition to the steering device 23.

Further, the host vehicle may be a tow truck, and the towed vehicle may be a malfunctioning vehicle, an accident vehicle, a parking violation vehicle, or the like.

What is claimed is:

1. A driving assistance apparatus mounted on a vehicle, the driving assistance apparatus comprising:
   a surrounding information acquisition device configured to detect a three-dimensional object present in surroundings of the vehicle and a lane marking extending in front of the vehicle to acquire information on the detected three-dimensional object and lane marking as surrounding information;
   a vehicle speed detection device configured to detect speed of the vehicle; and
   a control unit configured to
      execute, as a steering assist control of assisting a steering operation of a driver of the vehicle, a lane tracing assist control of assisting the steering operation such that a traveling position of the vehicle is maintained at a predetermined position in a lane width direction of a lane based on the surrounding information, and a lane changing assist control of assisting the steering operation such that the vehicle moves from an original lane in which the vehicle currently travels to a target lane adjacent to the original lane based on the surrounding information,
      start the lane changing assist control in a case where a predetermined start condition including execution of the lane tracing assist control is satisfied and terminate the lane changing assist control at a point in time when movement to the target lane is completed, and restart the lane tracing assist control at a point in time when the lane changing assist control is terminated,
   wherein, in a case where a time needed for the vehicle to move from a predetermined position of the original lane in the lane width direction to a predetermined position of the target lane in the lane width direction by the lane changing assist control and the lane tracing assist control is defined as a lane change time, the control unit is configured to
      determine whether or not a tow condition that is satisfied in a case where a towed vehicle is coupled to the vehicle is satisfied, based on the surrounding information and the speed of the vehicle, and
      make the lane change time longer in a case where the tow condition is satisfied when the start condition of the lane changing assist control is satisfied than a case where the tow condition is not satisfied.

2. The driving assistance apparatus according to claim 1, wherein the control unit is configured to make a specific time that is a time in the lane change time needed for the vehicle to move from the original lane to the target lane in the lane width direction longer in a case where the tow condition is satisfied when the start condition of the lane changing assist control is satisfied than a case where the tow condition is not satisfied.

3. The driving assistance apparatus according to claim 1, wherein the control unit is configured to determine that the movement to the target lane is completed at a point in time when the vehicle terminates crossing the lane marking at a boundary between the original lane and the target lane by the lane changing assist control to terminate the lane changing assist control.

4. The driving assistance apparatus according to claim 1, wherein the control unit is configured to determine that the tow condition is satisfied in a case where the speed of the vehicle is equal to or more than a predetermined speed threshold value, speed of a rear three-dimensional object that is a three-dimensional object detected behind the vehicle by the surrounding information acquisition device is substantially the same as the speed of the vehicle, and at least a part of the rear three-dimensional object is present in a predetermined first rear region defined behind the vehicle.

5. The driving assistance apparatus according to claim 1, wherein the control unit is configured to determine that the tow condition is satisfied in a case where the speed of the vehicle is equal to or more than a predetermined speed threshold value and at least a part of a rear three-dimensional object that is a three-dimensional object detected behind the vehicle is present in a predetermined second rear region defined behind the vehicle.

* * * * *